(12) United States Patent
Kean et al.

(10) Patent No.: US 7,154,653 B2
(45) Date of Patent: Dec. 26, 2006

(54) PARALLAX BARRIER AND MULTIPLE VIEW DISPLAY

(75) Inventors: Diana Ulrich Kean, Oxfordshire (GB); David James Montgomery, Oxford (GB); Jonathan Mather, Oxford (GB); Grant Bourhill, Stow on the Wold (GB); Graham R. Jones, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 69 days.

(21) Appl. No.: 10/803,292

(22) Filed: Mar. 18, 2004

(65) Prior Publication Data

US 2004/0218245 A1    Nov. 4, 2004

(30) Foreign Application Priority Data

Mar. 21, 2003   (GB)   ................................. 0306516.6

(51) Int. Cl.
   *G02B 26/02*   (2006.01)
(52) U.S. Cl. ...................................... 359/232; 359/462
(58) Field of Classification Search ................ 359/227, 359/323, 462, 464; 345/30, 619; 348/45–60
   See application file for complete search history.

(56) References Cited

U.S. PATENT DOCUMENTS

| | | | | |
|---|---|---|---|---|
| 5,315,377 A | * | 5/1994 | Isono et al. | 348/51 |
| 5,855,425 A | * | 1/1999 | Hamagishi | 353/7 |
| 6,445,406 B1 | * | 9/2002 | Taniguchi et al. | 348/51 |
| 6,459,532 B1 | | 10/2002 | Montgomery et al. | |
| 6,473,141 B1 | * | 10/2002 | Moseley et al. | 349/15 |

OTHER PUBLICATIONS

Chinese Office Action regarding Application No. 200410033096.8 dated Jun. 10, 2005.

* cited by examiner

*Primary Examiner*—Euncha P. Cherry
(74) *Attorney, Agent, or Firm*—Renner, Otto, Boisselle & Sklar, LLP

(57) ABSTRACT

A parallax barrier comprises evenly spaced groups of slits. Each group comprises two or more slits which are evenly spaced and the groups are spaced with a period which is greater than the product of the number of slits in each group and the slit period in each group. Such a barrier may be used with a spatial light modulator having columns of pixels whose structure cooperates with the barrier structure to provide a wider angle between views in a multiple view display, such as an autostereoscopic 3D display or a display providing two or more different views to two or more observers.

23 Claims, 16 Drawing Sheets

(33% resolution, 33% light)

(50% resolution, 50% light)

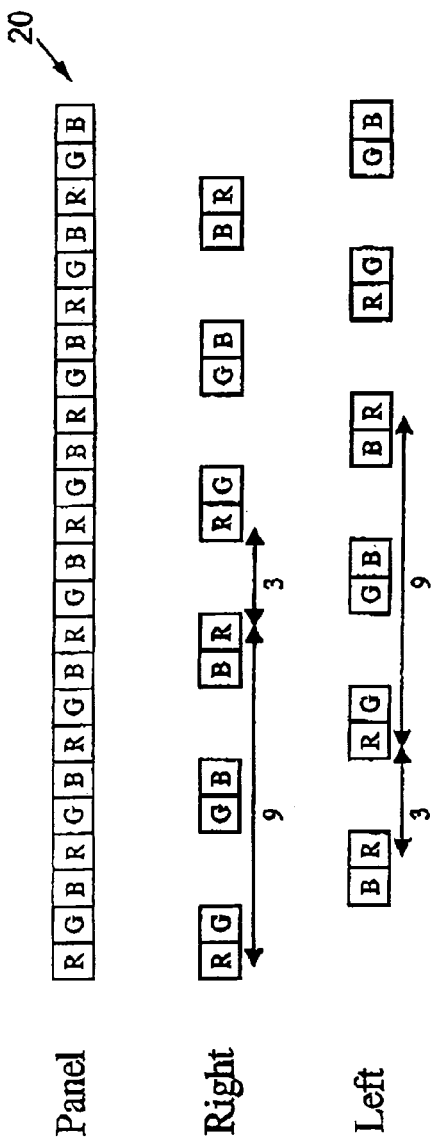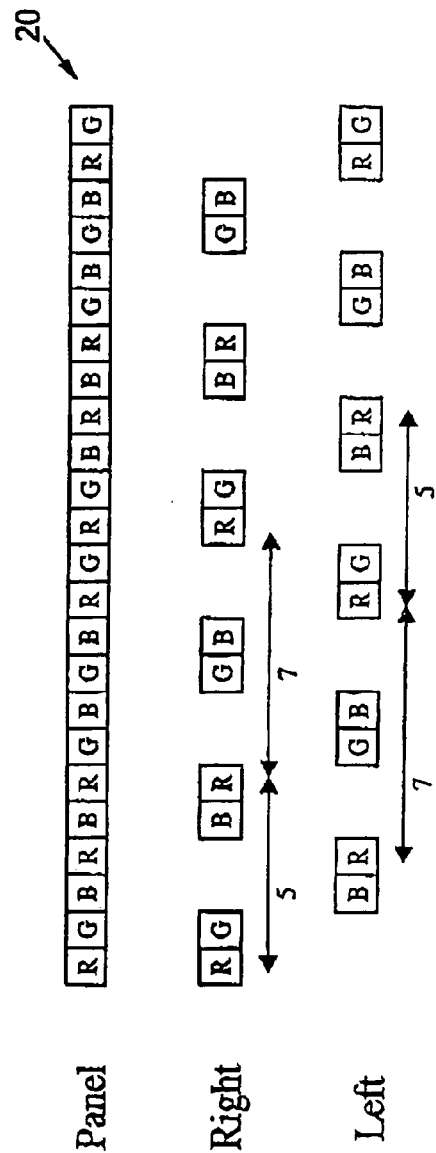

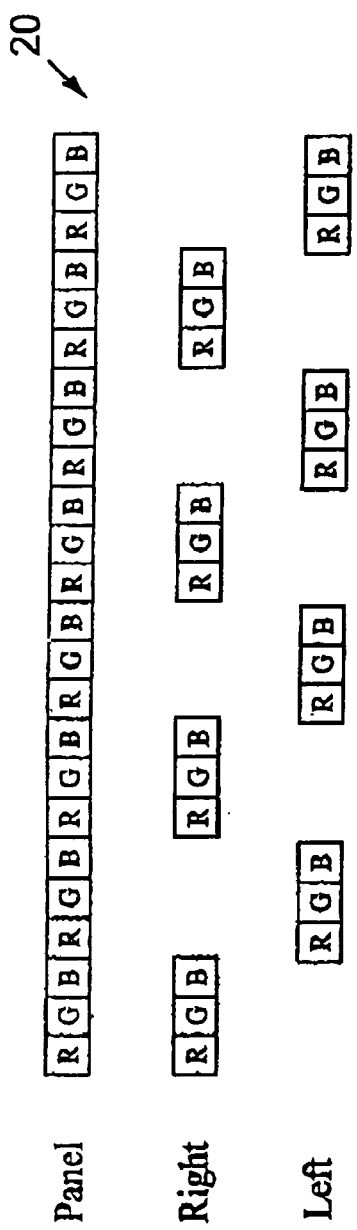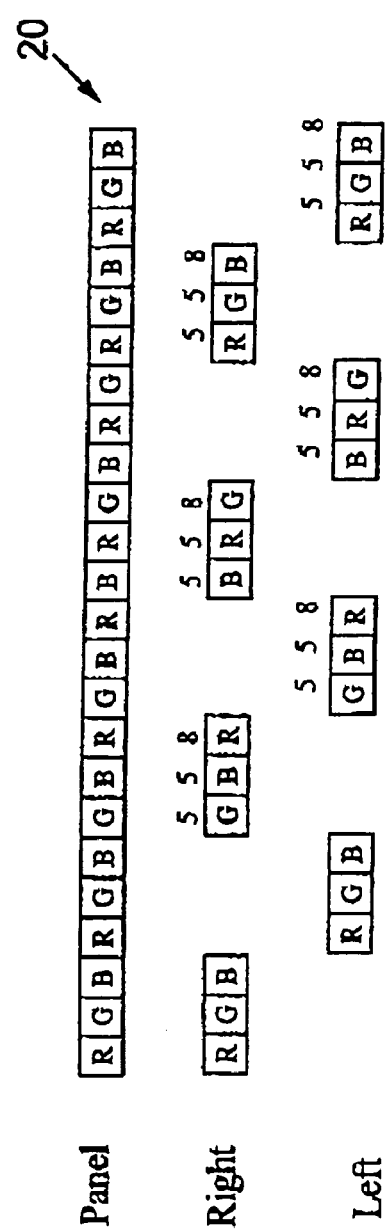

Fig. 15(c)

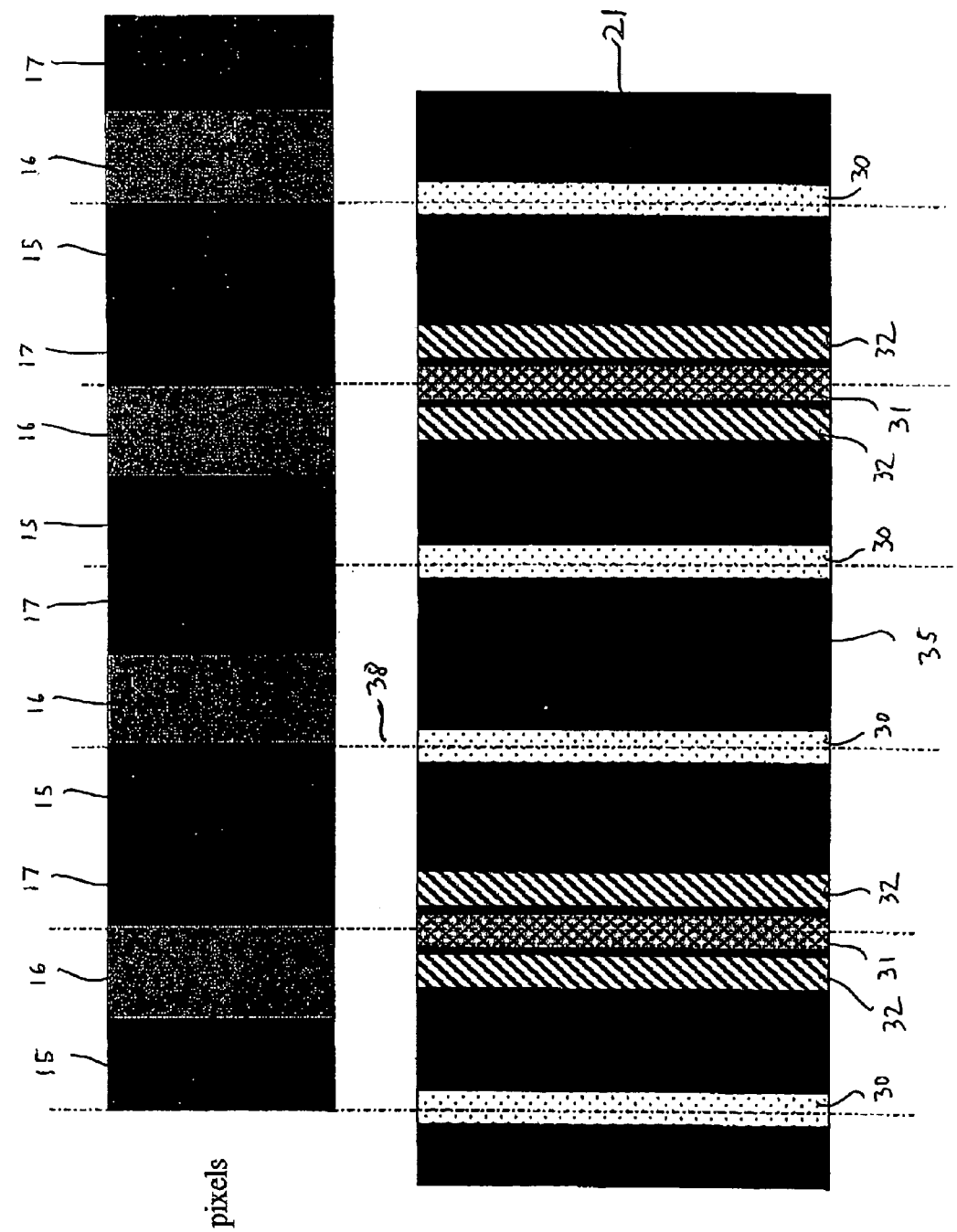

PARALLAX BARRIER AND MULTIPLE VIEW DISPLAY

This Nonprovisional application claims priority under 35 U.S.C. § 119(a) on Patent Application No.0306516.6 filed in Great Britain on 21 Mar., 2003, the entire contents of which are hereby incorporated by reference.

TECHNICAL FIELD

The present invention relates to a parallax barrier and to a multiple view display including such a barrier. Such displays may be used when two or more different people need to see two or more different images on the same display screen. The viewing angle difference is preferably quite large (around 60 degrees) between viewers.

Such displays may also be used as three-dimensional (3D) displays, especially autostereoscopic displays. Such displays may be used in 3D mobile handsets, 3D games, 3D computer monitors, 3D laptop displays, 3D workstations and 3D professional imaging (e.g. for medical, design or architectural usage). In some 3D displays, it is necessary, to increase the eye separation distance for a particular viewing distance or decrease the viewing distance for a particular eye separation. Both of these cases require a wider separation angle.

BACKGROUND

For many years now displays have been designed for multiple users and optimised so that viewers can see the same good image quality from different angles with respect to the display. This assumes that the multiple users require the same information from the display. However, there are many applications where it would be desirable for the individual users to be able to see different information from the same display. For example in an automobile, the driver may wish to view satellite navigation data while the passenger may wish to view a movie. If two displays were used in this instance, it would be possible for the driver to view the movie, which might be distracting, and providing two displays would take up extra space and increase cost. In computer games, each player may wish to view the game from his or her own perspective. This is currently done by each player viewing their unique perspective on individual screens. This takes up a lot of space and is not practical for portable games.

By showing more than one image to more than one user on one display, there can be a considerable saving in space and cost. This may be a desirable thing in airplanes where each passenger is provided with their own video screen. By providing one central screen for two or more passengers but retaining the ability to select their own movie, there could be a considerable saving in cost, space and weight. There is also the ability to preclude the users from seeing each other's views. This might be a desirable thing in security applications such as banking or sales transactions as well as games.

In normal vision, the two human eyes perceive views of the world from different perspectives due to their separate location within the head. These two perspectives are then used by the brain to assess the distance to various objects in a scene. In order to build a display which will effectively display a three dimensional image, it is necessary to recreate this situation and supply a so-called "stereoscopic pair" of images, one to each eye of the observer.

Three-dimensional displays are classified into two types depending on the method used to supply the different views to the eyes. Stereoscopic displays typically display both of the images over a wide viewing area. However, each of the views is encoded, for instance by colour, polarisation state or time of display, so that a filter system of glasses worn by the observer can separate the views and will only let each eye see the view that is intended for it.

Autostereoscopic displays require no viewing aids to be worn by the observer but the two views are only visible from defined regions of space. The region of space in which an image is visible across the whole of the display active area is termed a "viewing region". If the observer is situated such that one of their eyes is in one viewing region and the other eye is in the viewing region for the other image of the pair, then a correct set of views will be seen and a three-dimensional image will be perceived.

For flat panel autostereoscopic displays, the formation of the viewing regions is typically due to a combination of the pixel structure of the display unit and an optical element, generically termed a parallax optic. An example of such an optic is a parallax barrier. This element is a screen with vertical transmissive slits separated by opaque regions. This screen can be set in front of a spatial light modulator (SLM) with a two-dimensional array of pixel apertures as shown in FIG. 1.

The display comprises a transmissive spatial light modulator in the form of a liquid crystal device (LCD) comprising an active matrix thin film transistor (TFT) substrate 1, a counter substrate 2, a pixel (picture element) plane 3 formed by a liquid crystal layer, polarisers 4 and viewing angle enhancement films 5. The SLM is illuminated by a backlight (not shown) with illumination in the direction indicated by an arrow 6. The display is of the front parallax barrier type and comprises a parallax barrier having a substrate 7, an aperture array 8 and an anti-reflection (AR) coating 9.

The SLM is arranged such that columns of pixels are provided extending vertically for normal viewing with the columns having a horizontal pitch p. The parallax barrier provides an array 8 of apertures or slits with the slits being parallel to each other and extending parallel to the pixel columns. The slits have a width 2w and a horizontal pitch b and are spaced from the pixel plane 3 by a separation s.

The display has an intended viewing distance $r_o$ with left and right viewing windows 10 and 11 at the widest parts of the viewing regions defining a window plane 12. The viewing windows 10 and 11 have a pitch e which is generally made substantially equal to the typical or average human eye separation. The centre of each primary viewing window 10, 11 subtends a half angle $\alpha$ to the display normal.

The pitch b of the slits in the parallax barrier is chosen to be close to an integer multiple of the pixel pitch p of the SLM so that groups of columns of pixels are associated with a specific slit of the parallax barrier. FIG. 1 shows an SLM in which two pixel columns are associated with each slit of the parallax barrier.

FIG. 2 of the accompanying drawings shows the angular zones of light created from an SLM and parallax barrier where the parallax barrier has a pitch b of an exact integer multiple of the pixel column pitch p. In this case, the angular zones coming from different locations across the display panel surface intermix and a pure zone of view for image 1 or image 2 does not exist. In order to address this, the pitch b of the parallax optic is reduced slightly so that the angular zones converge at the window plane 12 in front of the display. This change in the parallax optic pitch is termed "viewpoint correction" and is shown in FIG. 3 of the accompanying drawings. The viewing regions created in this way are roughly kite shaped.

For a colour display, each pixel is generally provided with a filter associated with one of the three primary colours. By controlling groups of three pixels each with a different colour filter, substantially all visible colours may be produced. In an autostereoscopic display, each of the stereoscopic image "channels" must contain a sufficient number of colour filters for a balanced colour output. Many SLMs have colour filters arranged in vertical columns, due to ease of manufacture, so that all the pixels in a given column have the same colour filter associated with them. If a parallax optic is used with such an SLM such that three pixel columns are associated with each slit (or lenslet), only one colour will be visible in each viewing region. This may be avoided using, for example, the techniques disclosed in EP 0 752 610.

The function of the parallax optic is to restrict the light transmitted through the pixels to certain output angles. This restriction defines the angle of view of each of the pixel columns behind a given slit. The angular range of view of each pixel is decided by the refractive index of the glass n, the pixel width p and the separation between the pixel and the parallax optic planes s, and is given by $$\sin\alpha = n\sin\left(\arctan\left(\frac{p}{2s}\right)\right)$$

In order to increase the angle between viewing windows, it is necessary to either increase the pixel pitch p, decrease the gap between the parallax optic and the pixels s, or increase the refractive index of the glass n. Changing any of these variables is not easy. It is not always practical or cost effective to significantly change the refractive index of the substrate glass. Pixel pitch is typically defined by the required resolution specification of the panel and therefore cannot be changed. Additionally increasing pixel pitch requires a similar increase in the parallax barrier pitch which makes the barrier more visible, thus detracting from the final image quality. Decreasing s results in manufacturing problems associated with making and handling thin glass. Therefore, it is difficult to use a standard parallax barrier to create 3D or multi-view displays with wide viewing angles.

One option for increasing the pixel pitch and therefore the viewing angle is to rotate the pixel configuration such that the colour subpixels run horizontally rather than vertically as described in JP7-28015. This results in a threefold increase in pixel width and therefore an increase by roughly three times in viewing angle. As mentioned above, this has the disadvantage that the barrier pitch increases as pixel pitch increases which in turn increases the visibility. The manufacture and driving of such a non-standard panel may not be cost effective. Additionally, there may be applications in which the increase in viewing angle needs to be greater than three times the standard configuration and therefore simply rotating the pixels may not be enough.

The window plane defines the optimum viewing distance of the display. An observer whose eyes are located in this plane will receive the best performance of the display. As they move laterally in this plane, the image on the display will remain until they reach the edge of the viewing region, whereupon the whole display will swiftly change to the next image as the eye moves into the adjacent viewing region. The line of the window plane within a viewing region is sometimes termed a "viewing window".

In an ideal display of the type shown in FIGS. 1, 2 and 3, the intensity distribution of light across each viewing window would be a "top hat" function. In other words, for each viewing window, the light intensity would be constant across the viewing window and zero outside the viewing window in the viewing plane. However, degradation of the window intensity distribution occurs so that the lateral and longitudinal viewing freedom of the observer is reduced compared with that illustrated in FIG. 3. This can be caused by diffraction through the apertures as well as by gaps between pixels resulting in dark regions at the edges of the windows. In an ideal display, right eye image data would not be present in the left eye viewing region and vice versa. However, in practice, crosstalk occurs so that each eye can see some of the light intended for the other eye.

While a particular parallax element (slit or lenslet) is principally associated with one group of pixel columns, the adjacent groups of pixel columns will also be imaged by the element. Imaging of these groups creates lobes of repeated viewing regions to either side of the central, or zero order, lobe. These lobes repeat all the properties of the central lobe but are in general affected to a larger extent by the imperfections and aberrations of the optical system and will eventually become unusable as the lobe order increases. It is possible to use these higher order lobes in order to achieve a wider angle between windows. However, there will be a significant reduction in performance.

For example, by using a parallax optic having a pitch of b~3p, it is possible to use windows A and C in FIG. 4a of the accompanying drawings, for either 3D viewing or "dual view" where window B is either black or contains arbitrary data. While this gives an increased angle of view, the brightness is reduced to ⅔ of that produced by a barrier having a pitch b~2p since every third pixel is "viewed" in an unused window. The increase in barrier pitch would increase the visibility of the barrier and the horizontal resolution would decrease. The windows are smaller than those of a two view system with the same viewing angle as illustrated in FIG. 4b of the accompanying drawings, and therefore viewing freedom would be reduced. Another problem with this example is that, if the colour filters are arranged in RGB columns, then each window only sees one colour "subpixel".

FIG. 5 of the accompanying drawings illustrates a parallax barrier with a slit width=3p and spaced with a pitch b~6p. This results in windows which are at a separation angle of three times that of a standard parallax barrier of pitch b~2p. Because the slit width is 3p, all three colour filter colours 15, 16 and 17 are seen in the same proportion. However, this is only true at the exact centre of the viewing window as illustrated in FIG. 5a of the accompanying drawings. As soon as the viewer moves away from the centre of the viewing window, the neighbouring image data 15a will be seen and crosstalk will occur as shown in FIG. 5b of the accompanying drawings.

In order to reduce this crosstalk, the slit width can be reduced to less than 3p. However, this results in an uneven colour balance. As shown in FIG. 6a of the accompanying drawings, when the viewer is in the centre of the viewing window, the "white" pixel will appear light green because more of the green sub-pixel 16 is visible than each of the red and blue sub-pixels 15 and 17. Because of the reduced slit width, it is possible for the viewer to move away from the centre of the viewing window without seeing the neighbouring image data. However, the colour balance changes with angle of view and, as shown in FIG. 6b of the accompanying drawings for movement in one direction, the "white" pixel will now appear cyan.

Another way to achieve a larger separation angle would be to use the standard b~2p barrier and use both secondary lobes A and D in FIG. 7a of the accompanying drawings, which are separated by two window widths. This would have the same barrier visibility, brightness, and horizontal resolution as the two view system shown in FIG. 7b of the accompanying drawings with the same angle. However, the viewing freedom would be significantly reduced.

Another known type of directional display is the rear parallax barrier display as shown in FIG. 8 of the accompanying drawings. In this case, the parallax barrier 7, 8 is placed behind the SLM 1 to 5 i.e. between the SLM and the backlight. This arrangement has the advantage that the barrier is kept behind the SLM away from possible damage.

Lenticular screens are used to direct interlaced images to multiple directions, which can be designed to give a 3D image or give multiple images in multiple directions. Practical lenses tend to suffer from scatter and poor anti-reflection performance so that the surface is very visible in both ambient and backlit environments. Therefore, the image quality of lenticular screens can be poor and the system suffers from similar problems as parallax barriers such as the need for close proximity to the image pixels.

Holographic methods of image splitting also exist but they suffer from viewing angle problems, pseudoscopic zones and a lack of easy control of the images.

Micropolariser displays use a polarised directional light source and patterned high precision micropolariser elements aligned with the LCD pixels. Such a display offers the potential for high window image quality as well as 2D/3D function in a compact package. The dominant requirement is the incorporation into the LCD of micropolariser elements to avoid parallax issues.

U.S. Pat. No. 6,424,323 discloses an image deflection system comprising a lenticular screen overlying a display device. The display is controlled to provide at least two independent images to be viewed from different viewing positions.

JP 7-28015 discloses the use of a patterned pixel shape with a lenticular barrier in which the windows formed by the display have a minimum crosstalk. Crosstalk is reduced by moving the relative positions of the pixels and appropriately arranging the spacing and orientation.

Other known types of multiple view displays are disclosed in WO 98/27451, DE 19822342 and JP H7-104212.

JP-A-8-36145 discloses a parallax barrier in which the slits have pitches which are randomly chosen from a plurality of predetermined pitches. The chosen pitches may be repeated as groups across the barrier.

GB-2352573 discloses a parallax barrier in which the slits are spaced apart uniformly with each slit comprising a plurality of sub-apertures.

SUMMARY

According to a first aspect of the invention, there is provided a parallax barrier comprising a plurality of groups of parallel slits, each group comprising N slits where N is an integer greater than 1, the slits of each group being spaced apart with a first pitch b1 in a direction perpendicular to the slits and the groups being spaced apart with a second pitch b2, in the direction perpendicular to the slits, greater than N.b1.

The maximum transmission of light through each of the slits in a group may be substantially the same.

Adjacent slits may be separated by a barrier portion having finite width.

The second pitch b2 may be substantially equal to 2.N.b1.

In one embodiment, N is equal to 2. In another embodiment, N is equal to 3.

The barrier may comprise an active device for providing the groups of slits in a first mode of operation and an alternative arrangement of slits in a second mode of operation. The slits may be spaced apart with a substantially uniform pitch, in the direction perpendicular to the slits, in the second mode. The barrier may have a third mode of operation in which the barrier is substantially uniformly transmissive to light throughout its operating area.

According to a second aspect of the invention, there is provided a multiple view display comprising a barrier according to the first aspect of the invention and a spatial light modulator.

The modulator may comprise a plurality of columns of pixels extending parallel to the slits.

The columns may have a third pitch p, in a direction perpendicular to the longitudinal directions of the columns, which differs from the first pitch so as to provide viewpoint correction. The first pitch b1 may be given by;

$$b1 = \frac{p}{1 \pm \frac{p}{e}}$$

where p is the pitch of the columns and e is the pitch of primary viewing windows produced by the display.

The columns may have a third pitch p, in a direction perpendicular to the longitudinal directions of the columns, which is greater than the first pitch.

The columns may comprise red, green and blue columns.

The columns may be arranged as repeating groups with each group being arranged in the order blue, red, blue, red, green, blue, green, blue, red, green, red, green.

The columns may be arranged as repeating groups with each group arranged in the order green, green, blue, blue, red, red.

The columns may be arranged as repeating groups of 18 with each group comprising three consecutive pairs of identical triplets, the orders of the colours of the triplets of the consecutive pairs being rolled by one position with respect to each other.

The columns may be arranged as repeating groups of 36 with each group comprising six consecutive pairs of identical triplets, the triplets of the consecutive pairs having orders comprising all permutations of red, green and blue.

The display may comprise a display driver for supplying image signals representing a plurality of views as interlaced columns to the modulator. The image signals may represent two views. The display may comprise an autostereoscopic display in which the image signals represent at least one pair of stereoscopic views.

It is thus possible to provide a parallax barrier which is suitable for use in multiple view displays having relatively wide viewing angles between viewing regions. Different embodiments of such displays may exhibit different advantages from among: reduced barrier visibility; reduced crosstalk between windows; improved viewing freedom; increased brightness; and improved colour matching.

BRIEF DESCRIPTION OF THE DRAWINGS

FIG. 15 shows views similar to FIG. 14 for a display of the type shown in FIG. 11; and FIG. 16 illustrates a parallax barrier constituting an embodiment of the invention and an associated pixel colour filter arrangement.

Like reference numerals refer to like parts throughout the drawings.

DETAILED DESCRIPTION

Figure 1:
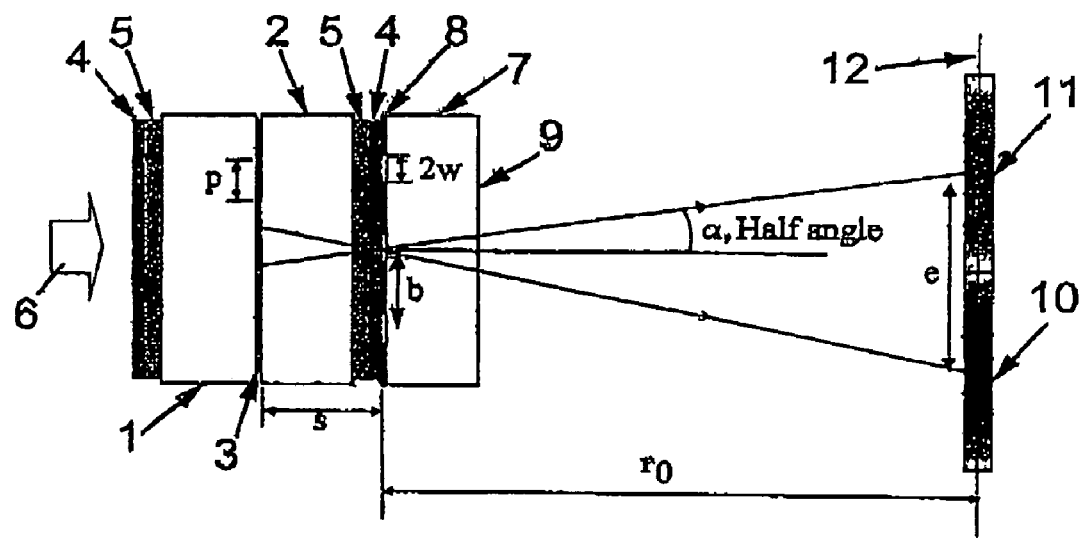
FIG. 1 is a diagrammatic horizontal cross-sectional view of a known type of multiple view display.
Figure 2:
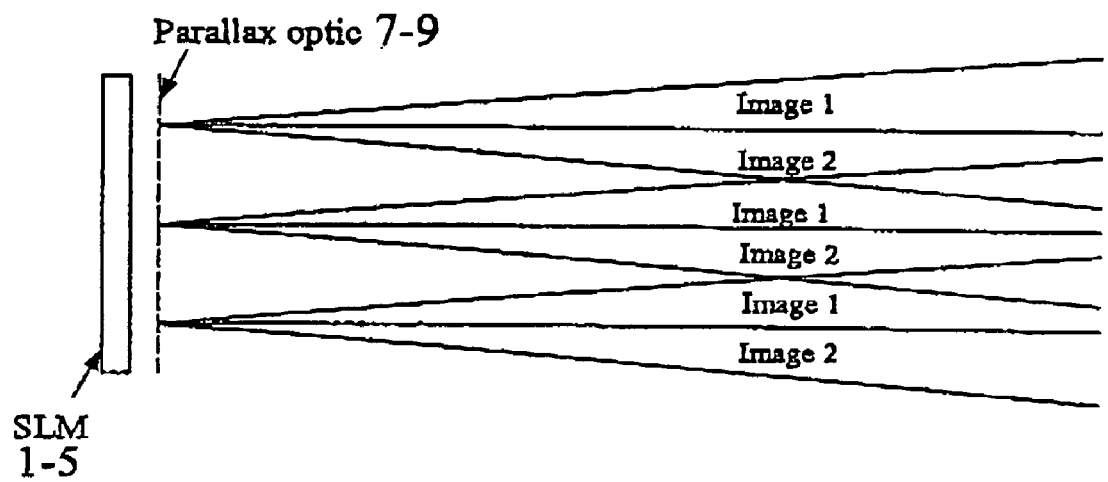
FIG. 2 is a diagrammatic plan view illustrating angular viewing regions created by the display of FIG. 1.
Figure 3:
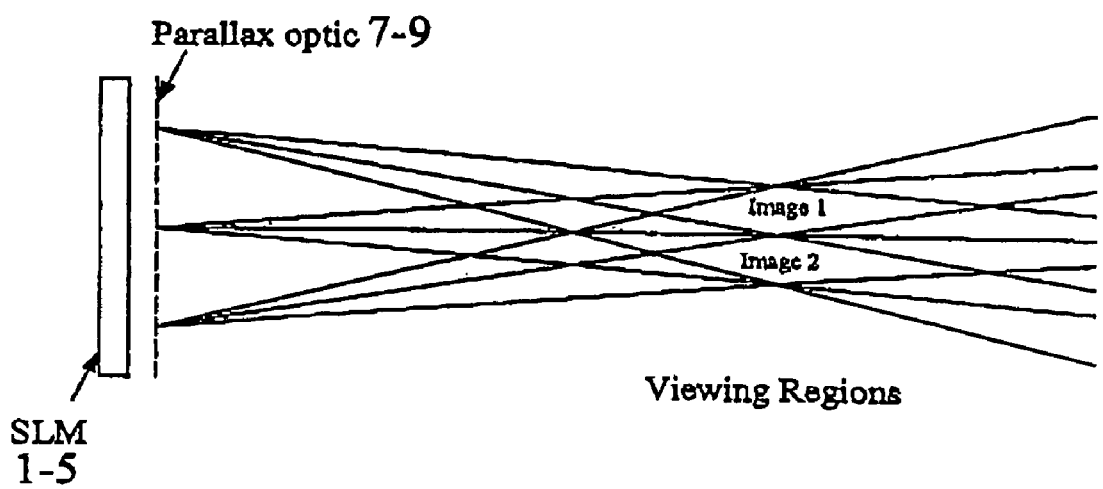
FIG. 3 is a diagrammatic plan view illustrating viewpoint correction in the display of FIG. 1.
Figure 9:
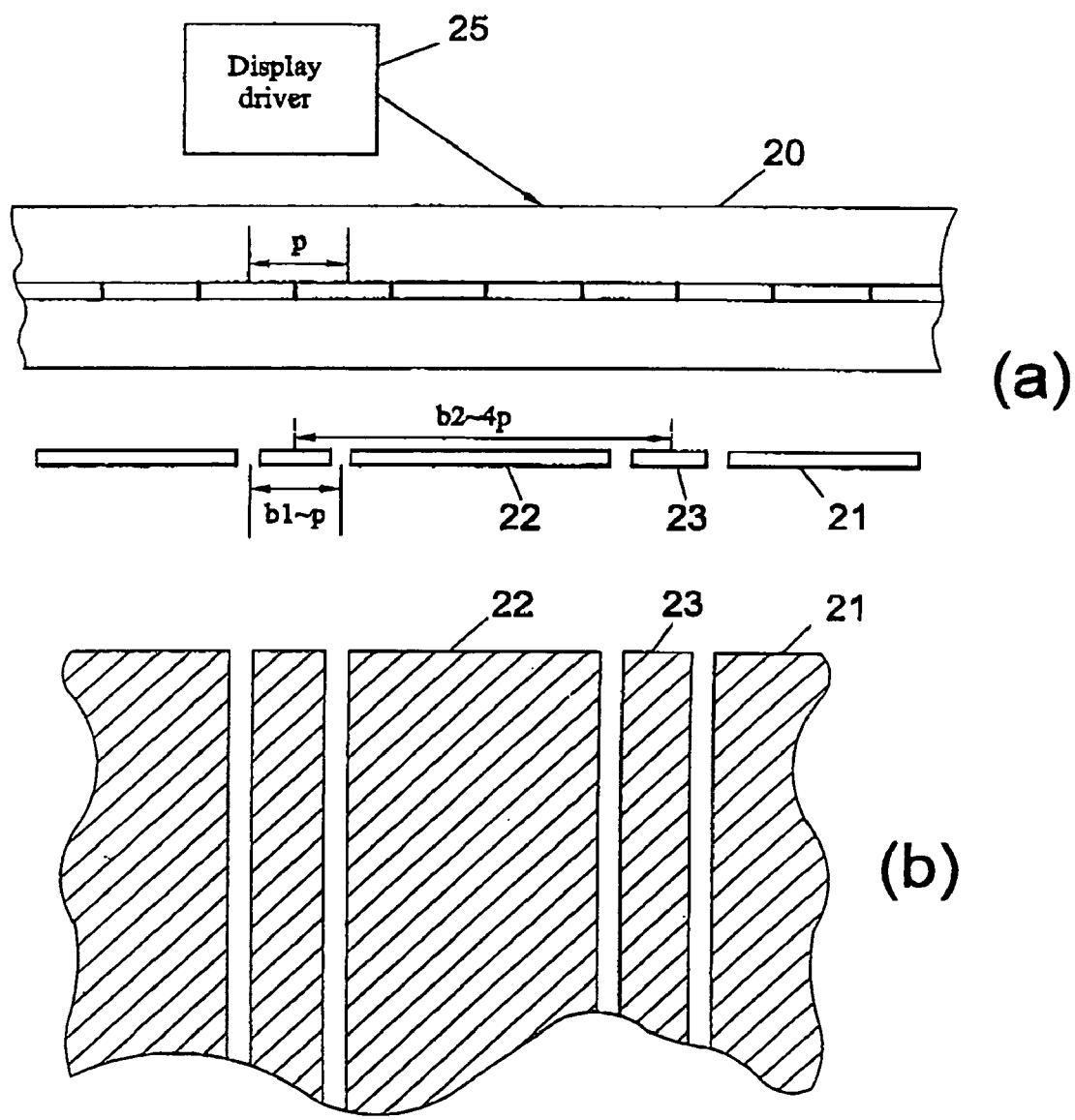
FIG. 9 shows at (a) a diagrammatic cross-sectional plan view of a parallax barrier and display constituting an embodiment of the invention and at (b) a diagrammatic front view of the parallax barrier.

The display shown in FIG. 9 is a two view directional display which may be used as an autostercoscopic 3D display or as a display for providing two unrelated views to different observers. The display comprises a spatial light modulator in the form of an LCD 20, for example of the type illustrated at 1 to 5 in FIG. 1. The LCD 20 is pixellated and operates in transmissive mode so as to modulate light passing through the pixels from a backlight (not shown). However, other types of display may be used to modulate light in transmissive or reflective modes or to generate light within the display device itself (in the case of a front parallax barrier arrangement).

The display also comprises a parallax barrier 21 disposed in front of the LCD 20, i.e. between the LCD 20 and the viewer or viewers. The barrier 21 may, for example, be embodied using standard emulsion techniques or retarder and polariser techniques or in any suitable way for providing regions such as 22 and 23 which are substantially opaque to light from the LCD 20 and slits therebetween which are substantially transmissive to light from the LCD 20. The regions 22 and 23 have a finite width and all of the slits have the same maximum light transmission.

The LCD 20 is pixellated so as to form columns of pixels with a substantially uniform pitch p in a direction perpendicular to the longitudinal axes of the columns, the direction of which is generally horizontal during normal use of the display.

Figure 8:
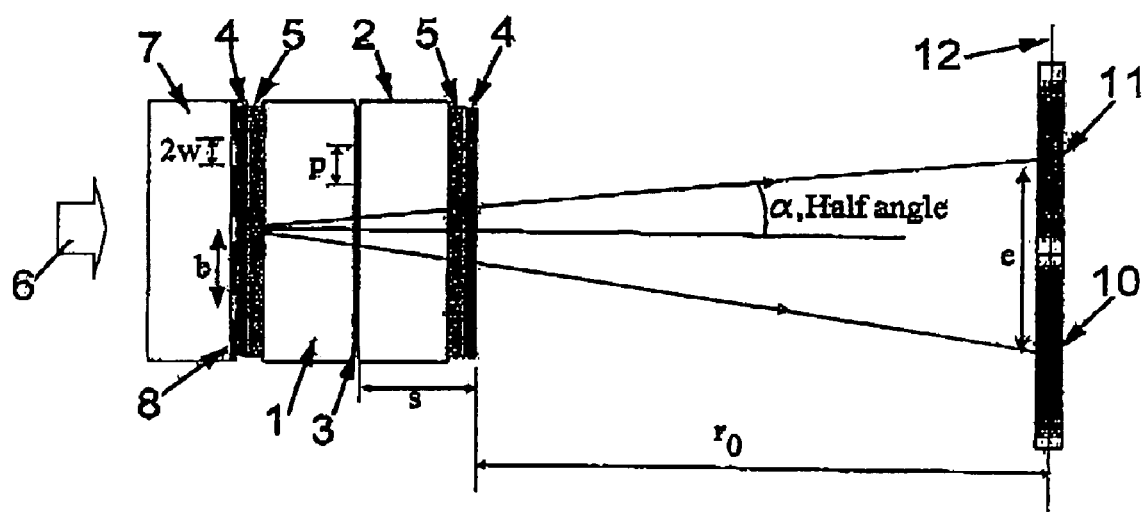
FIG. 8 is a diagrammatic cross-sectional plan view of a known type of rear parallax barrier multiple view display.

The slits of the barrier 21 are arranged non-periodically and extend parallel to the longitudinal axis of the pixel columns. In particular, the slits are arranged in evenly spaced groups of slits with the slits in each group being evenly spaced. In the embodiment illustrated, each group comprises two slits with the slits in each group being spaced with a pitch b1 which is similar to the pitch p of the pixel columns but differs therefrom so as to provide viewpoint correction as described hereinbefore. Thus, the pitch b1 is slightly less than the pitch p for a front parallax barrier display of the type shown in FIG. 9 but is slightly greater than the pixel column pitch p for a rear parallax barrier display of the type illustrated in FIG. 8. In particular, in the case of a front parallax barrier, the pitch b1 is given by, $p/(1+(p/e))$ whereas, for a rear parallax barrier, the pitch b1 is given by $p/(1-(p/e))$.

All of the groups of slits have the same number of slits with the same pitch b1 and, in the embodiments shown, the slits extend throughout the height of the parallax barrier 21. The groups of slits are spaced apart in the direction perpendicular to the slits (horizontal during normal use of the display) by the same pitch b2 which is equal to four times the pitch b1 and thus approximately equal to four times the pitch p of the pixel columns.

The display is driven by a display driver illustrated diagrammatically at 25 in FIG. 9 such that image data for the two views which are to be displayed are interlaced as vertical stripes. The display driver 25 may be arranged to receive images for display and to interlace the data so as to ensure that the individual pixel columns display the correct vertical slices of the images. The display driver 25 may form part of the display or may be embodied partly or wholly within other apparatus, such as a computer, microprocessor or the like. The images may be captured "real" images or may be computer-generated. The images may form a stereoscopic pair for autostereoscopic 3D use of the display or may be stereoscopically unrelated, such as completely different viewpoint images of a game for two players or a series of cinematographic images for displaying a "movie" to one viewer and a satellite navigation image for another viewer, such as the driver of a vehicle.

Figure 10:
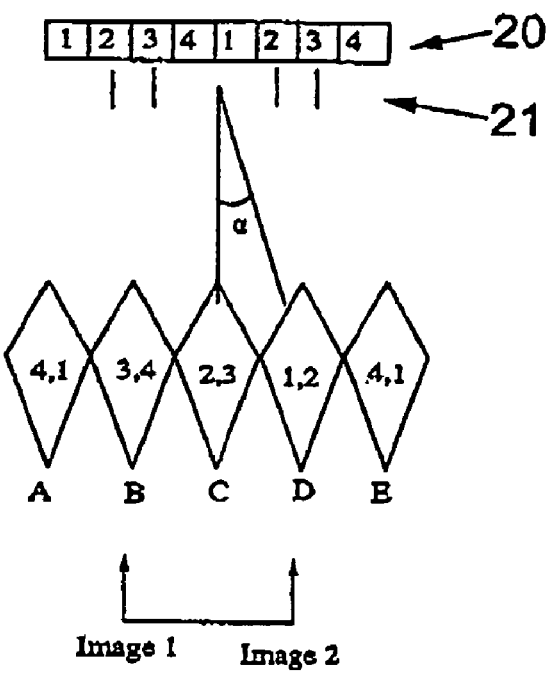
FIG. 10 is a diagrammatic plan view of the display of FIG. 9 illustrating the generation of viewing regions.

As shown in FIGS. 9 and 10, the slits of the barrier 21 are aligned with or adjacent to the middle lines of the columns of pixels. In practice, the slits are offset from such a mid-line alignment by a small amount so as to provide viewpoint correction. The display driver 25 supplies vertical image slices numbered 1 to 4 in FIG. 10 to a group of four columns of pixels nearest each group of slits. The slits of the barrier 21 cooperate with the pixellation of the LCD 20 so as to define or create viewing regions labelled A to E in FIG. 10. In each of the viewing regions, each group of slits restricts visibility of the columns of pixels such that two adjacent pixel columns only are visible to a viewer viewing the display from the viewing region. Thus, in the zero order lobe viewing region C, only those columns displaying image slices 2 and 3 are visible. Only the pixel columns displaying the image slices 1 and 2 are visible in the positive first order lobe viewing region D whereas only the pixel columns displaying the image slices 3 and 4 are visible in the negative first order lobe viewing zone B. Similarly, in the plus and minus second order lobe viewing regions E and A, only the pixel columns displaying the image slices 1 and 4 are visible.

The display driver 25 supplies the pixel image data to the LCD 20 such that the image slices 1 and 2 are provided from one of the images and the image slices 3 and 4 are provided from the other of the images. Thus, the first and second images forming the first and second views are visible in the viewing regions D and B, respectively. When providing autostereoscopic viewing, provided the left and right eyes of the observer are in the viewing regions B and D, respectively, a stereoscopic pair of images can be viewed correctly to provide the 3D effect. Conversely, a viewer whose eyes are in the viewing region D can see one of the images but not the other whereas a viewer whose eyes are in the region B can see the other image but not the first image.

The half angle α subtending the centres of the viewing zones B and D at the display is given by;

$$\alpha = \sin^{-1}\left(n\sin\left(\tan^{-1}\frac{p}{s}\right)\right)$$

Compared with a conventional display of the type illustrated in FIGS. 1 to 3 and 4(a), the angle between the views is approximately doubled. In the case of an autostereoscopic display, this allows the optimum viewing distance or viewing window plane to be approximately half the distance away from the display compared with the conventional arrangement. Conversely, in the case of "unrelated" views, the angle between views for use with unrelated images is substantially increased.

The viewing regions to either side of the regions B and D which are actually used contain 50% of each image. Thus, the contribution to crosstalk from neighbouring viewing regions is reduced because 50% of the stray light is from the same image source. Compared with the three view arrangement illustrated in FIG. 4(a), the display illustrated in FIGS. 9 and 10 makes use of 50% of the available light and each image is displayed by 50% of the pixels so that the horizontal resolution is 50% of the LCD resolution. In the case of the three view display of FIG. 4(a), 33% of light is used and 33% of the LCD resolution is used by each image.

Figure 11:
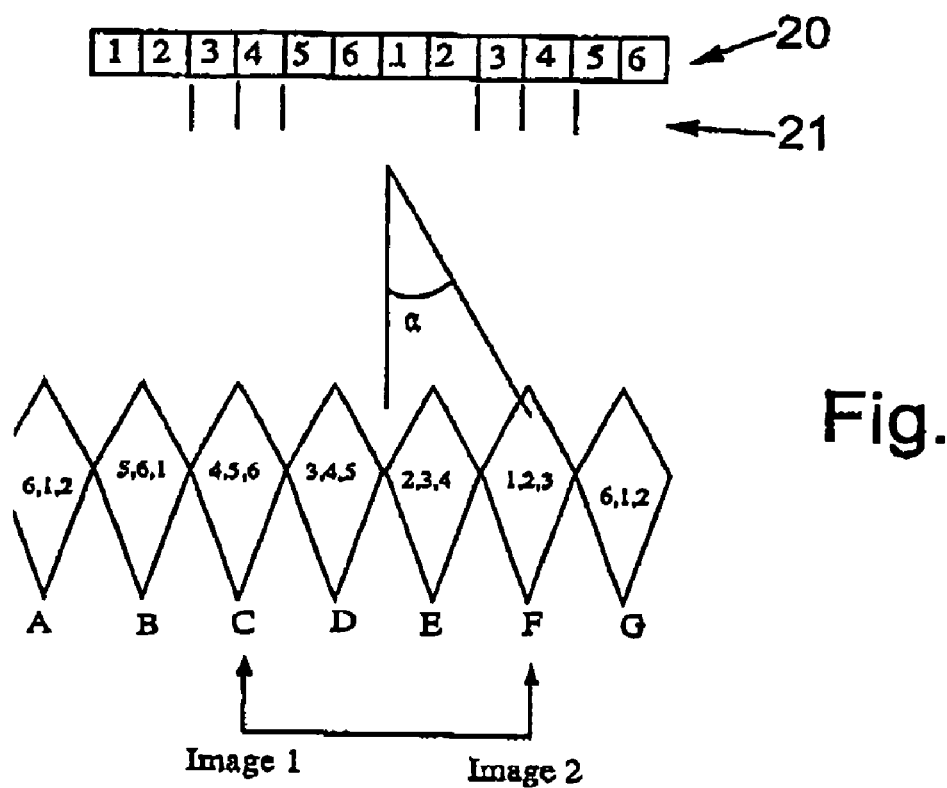
FIG. 11 is a view similar to FIG. 10 of another embodiment of the invention.

The display shown in FIG. 11 differs from that shown in FIGS. 9 and 10 in the arrangement of the parallax barrier 21 and the image slices displayed by the LCD 20. In this embodiment, the barrier 21 comprises groups of three slits with the slits of each group having the same pitch b1 as in the groups of slits in the display shown in FIGS. 9 and 10. However, the groups of slits are spaced with a horizontal pitch b2 equal to six times the pitch b1 and approximately equal to six times the pitch p of the pixel columns to within viewpoint correction. Also, each slit is aligned (to within viewpoint correction) with the boundary between a respective adjacent pair of pixel columns of the LCD 20.

Figure 4A:
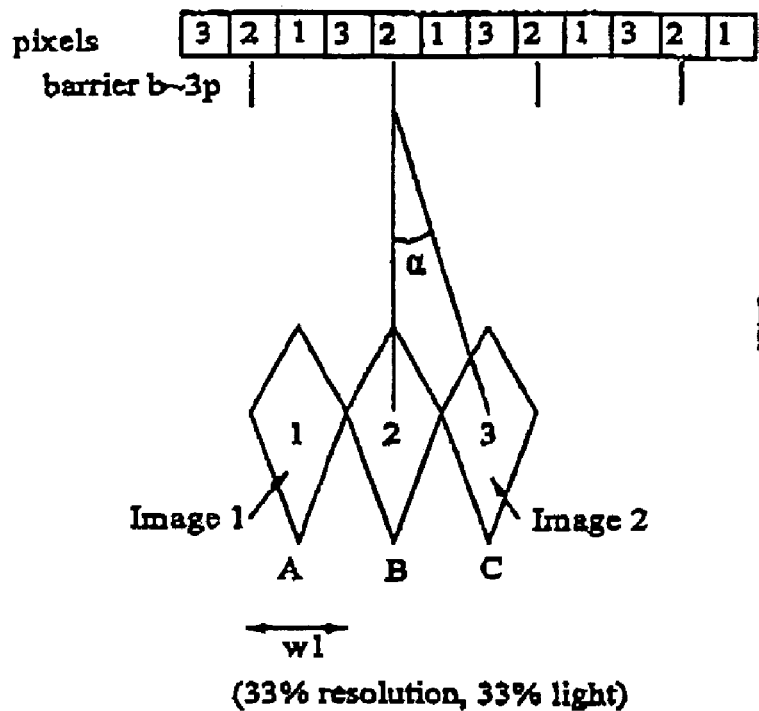
FIG. 4 illustrates diagrammatically at (a) and (b) two comparative examples of multiple view displays.
Figure 4B:
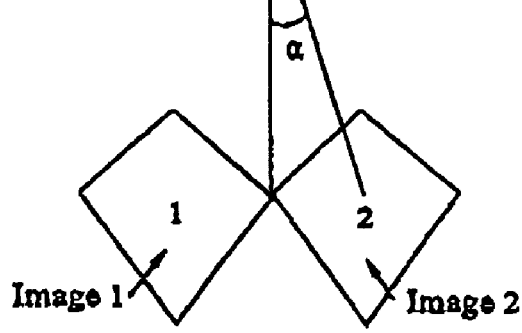
Figure 5:
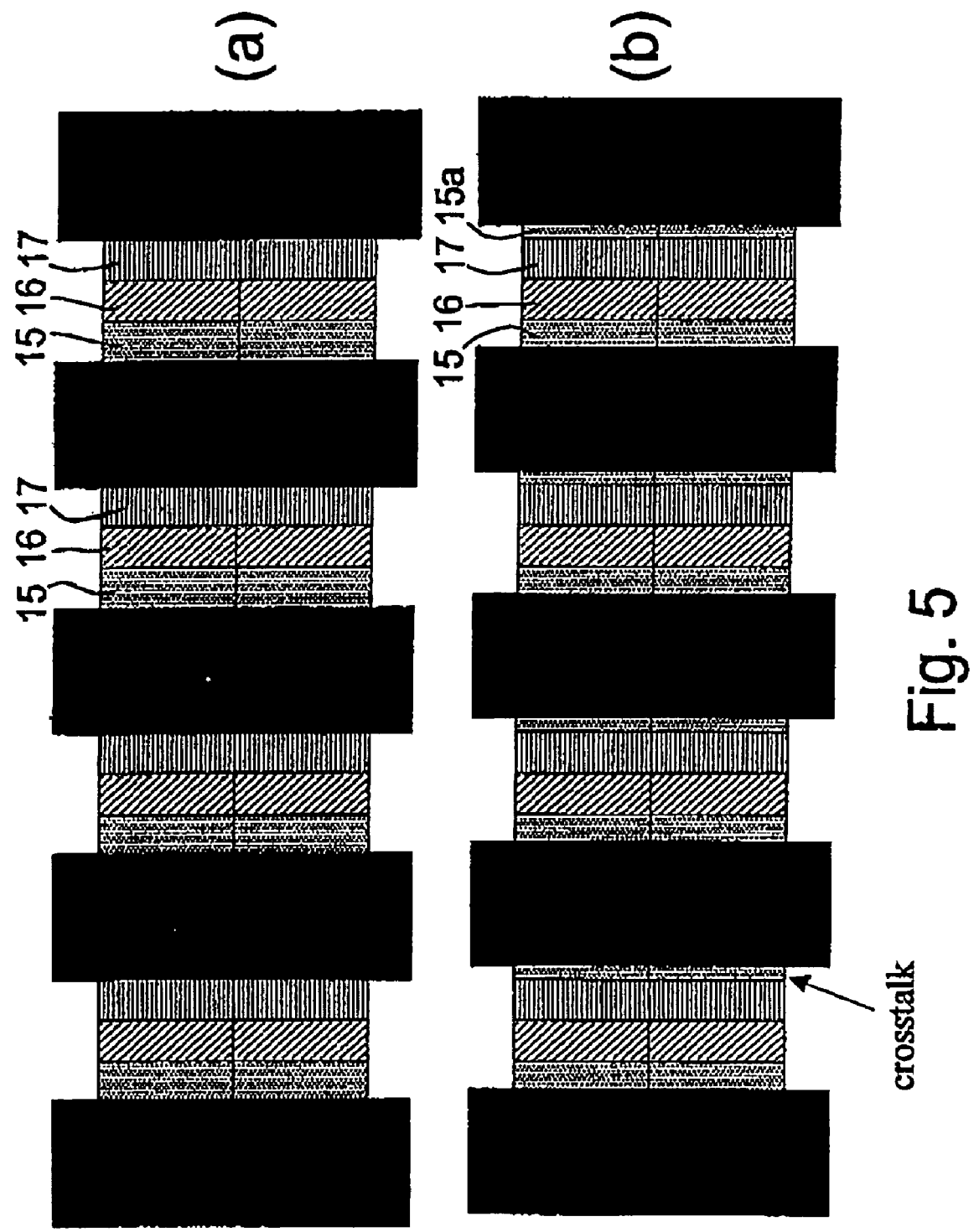
FIG. 5 is a diagram illustrating visibility of pixel columns for on-centre viewing at (a) and for off-centre viewing at (b)
Figure 6:
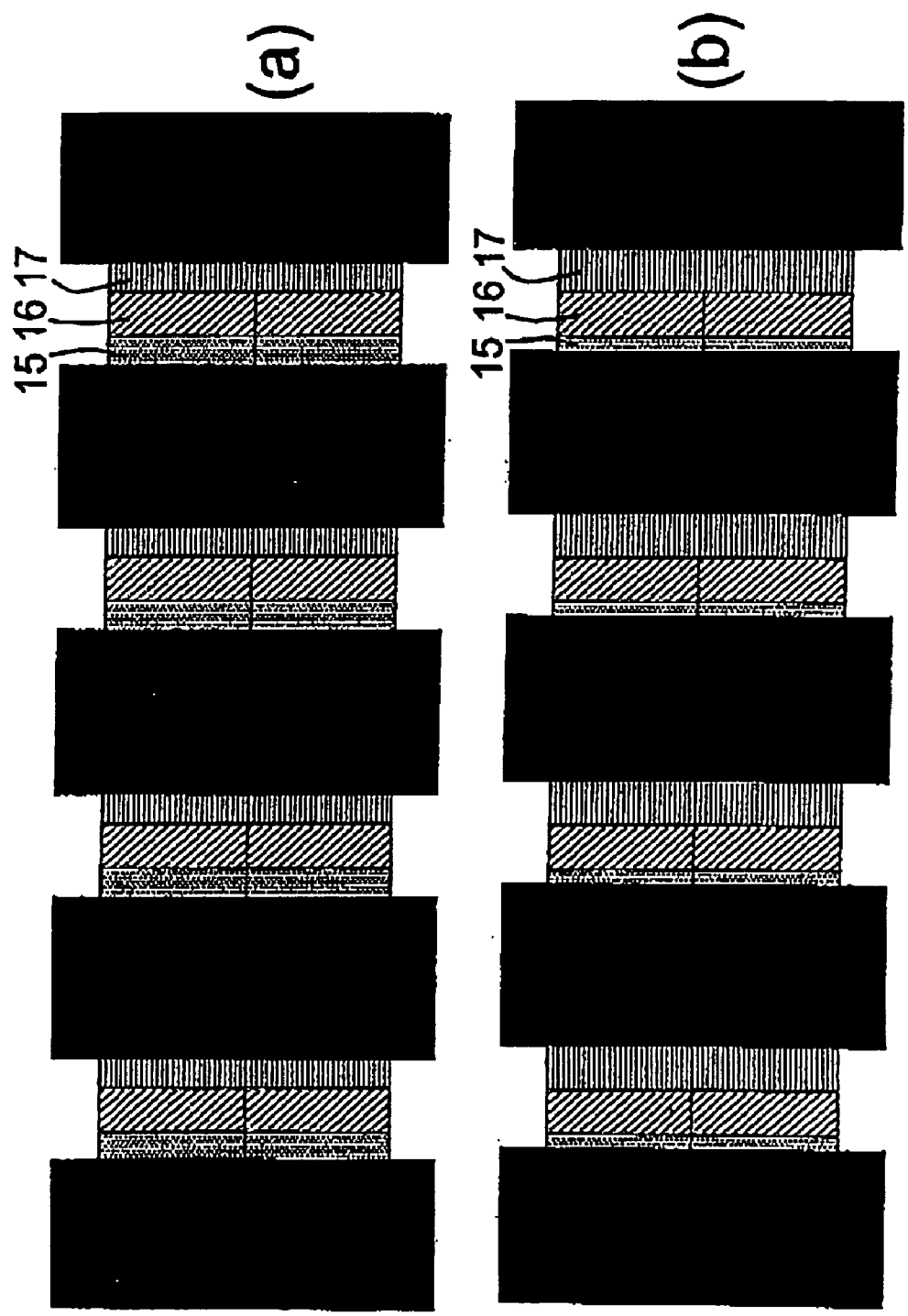
FIG. 6 shows views similar to FIG. 5 for a parallax barrier of reduced slit width.
Figure 7:
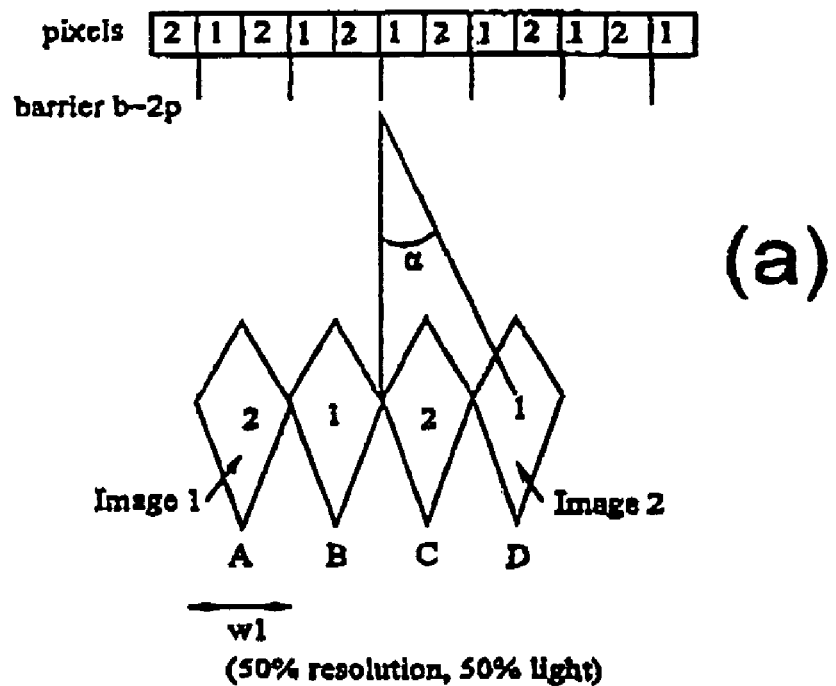
FIG. 7 shows views similar to FIG. 4 for further comparative examples of multiple view displays.
Figure 7:
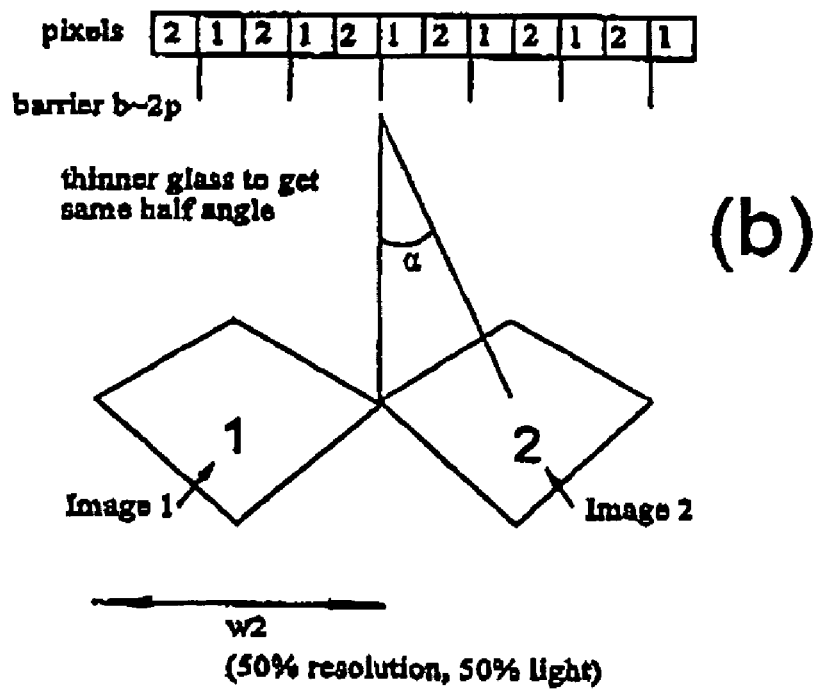

Each group of pixel columns associated with each group of slits of the barrier 21 displays a vertical image or view slices labelled 1 to 6 in FIG. 11. The arrangement of the barrier 21 in relation to the pixel columns of the LCD 20 gives rise to the generation of viewing regions labelled A to G in FIG. 11. In the first order viewing region D, the pixel columns displaying view slices 3, 4 and 5 are visible whereas, in the viewing region E, the pixel columns displaying the view slices 2, 3 and 4 are visible. In the viewing region C, the pixel columns displaying the view slices 4, 5 and 6 are visible whereas in the viewing region F, the pixel columns displaying the view slices 1, 2 and 3 are visible. In the viewing region B, the pixel columns displaying the view slices 5, 6 and 1 are visible whereas, in the viewing region G, the pixel columns displaying the view slices 6, 1 and 2 are visible. The display driver 25 supplies image data to the LCD 20 such that the view slices 4, 5 and 6 are of the first image whereas the view slices 1, 2 and 3 are of the second image. Thus, the first image is visible and the second image is substantially not visible in the viewing region C whereas the second image is visible and the first image is substantially not visible in the viewing region F. The half angle α for the viewing regions C and F is given by;

$$\alpha_3 = \sin^{-1}\left(n\sin\left(\tan^{-1}\frac{3p}{2s}\right)\right)$$

which gives an angle between views which is approximately three times that for the display illustrated in FIG. 4(a). Thus, for autostereoscopic display purposes, the optimum viewing distance or viewing window plane is much nearer the display. Conversely, for viewing unrelated images, a greater separation of viewing regions is provided.

The windows to either side of each window used for viewing in the display of FIG. 11 contain 66.7% of the same image data. Thus, the contribution to crosstalk from neighbouring windows is reduced because 66.7% of the stray light is from the same image source. 50% of the LCD resolution is used for each image and 50% of the available light is used for each image.

As shown in FIG. 11, by using the pixel columns displaying the view slices 4, 5 and 6 for the first image and 1, 2 and 3 for the second image to display red, green and blue data, respectively, colour balance is maintained. On-centre viewing of the red, green and blue pixel columns 15, 16 and 17, respectively, is illustrated at (a) in FIG. 12. However, a major cause of crosstalk results from the outer edges of each group of slits because these are closest to pixel columns with opposite image data. When the viewer moves away from the centre of the viewing window, neighbouring image data is seen and crosstalk occurs as illustrated at (b) in FIG. 12.

Figure 12:
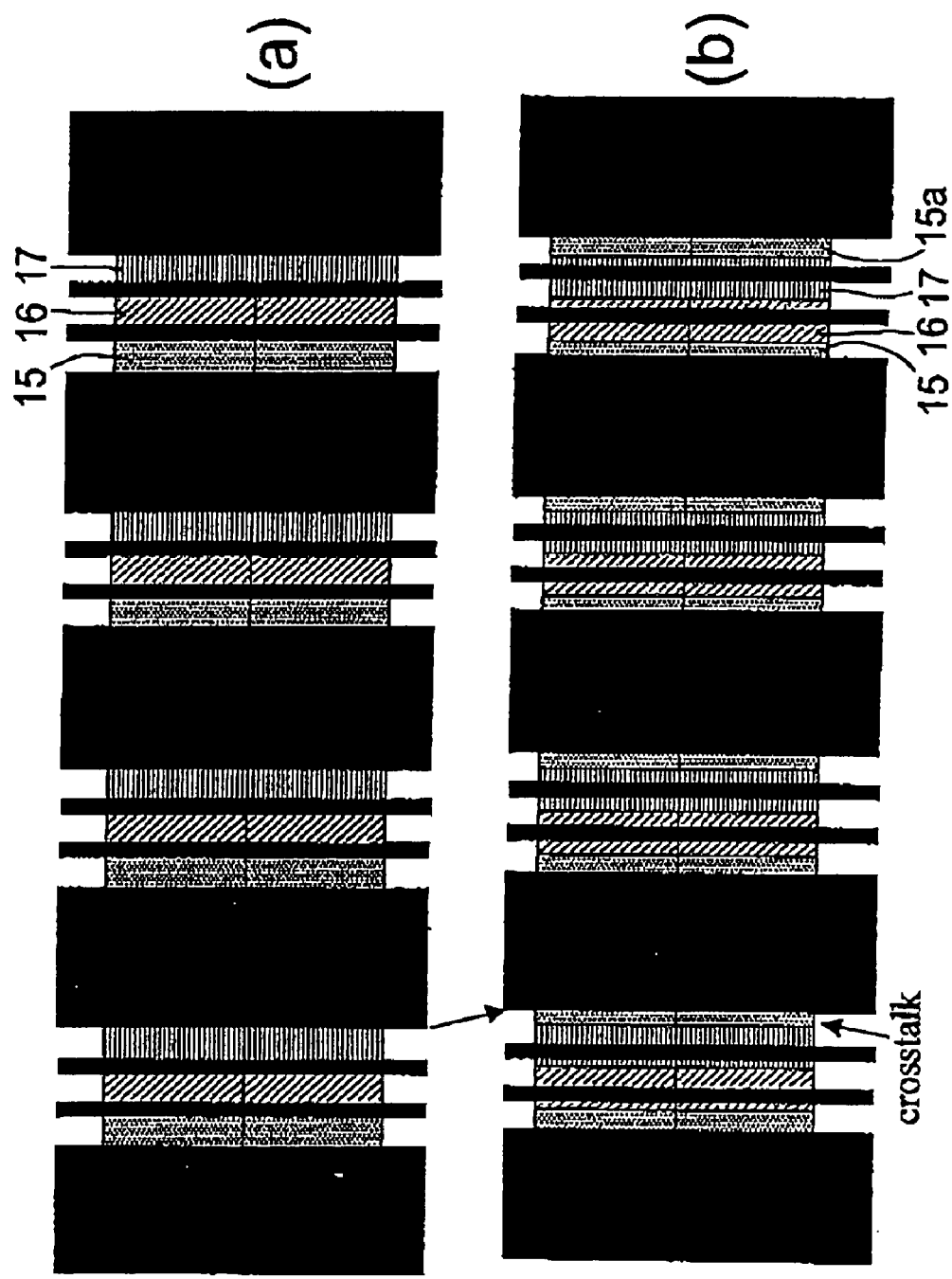
FIG. 12 illustrates the visibility of columns of pixels in the display shown in FIG. 11 for on-centre viewing at (a) and for off-centre viewing at (b)
Figure 13:
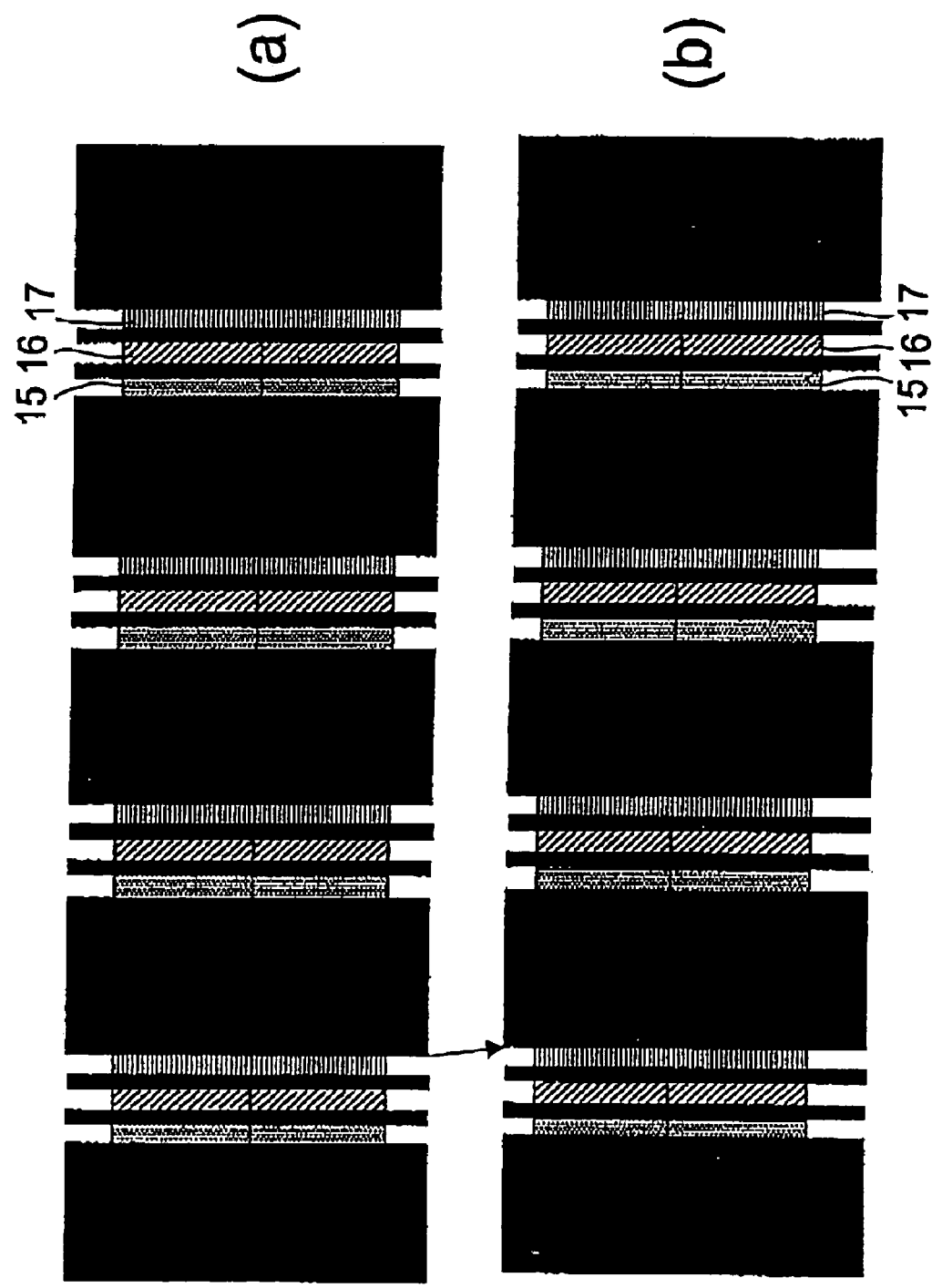
FIG. 13 illustrates a modification of the display shown in FIGS. 11 and 12 showing pixel column visibility for on-centre viewing at (a) and for off-centre viewing at (b)

As illustrated in FIG. 13, crosstalk may be reduced by reducing the widths of the slits and by reducing the slit pitch in each group of slits. On-centre viewing and off-centre viewing are illustrated at (a) and (b) in FIG. 13 and correspond to the views shown at (a) and (b), respectively, in FIG. 12. Although the reduced slit width reduces the light output of the display, crosstalk effects are reduced while permitting greater lateral freedom of movement for each viewer. Although the pitch of the slits in each group is reduced in the arrangement of FIG. 13 as compared with the arrangement of FIG. 12, the pitch of the groups of slits is unchanged.

Figure 14C:
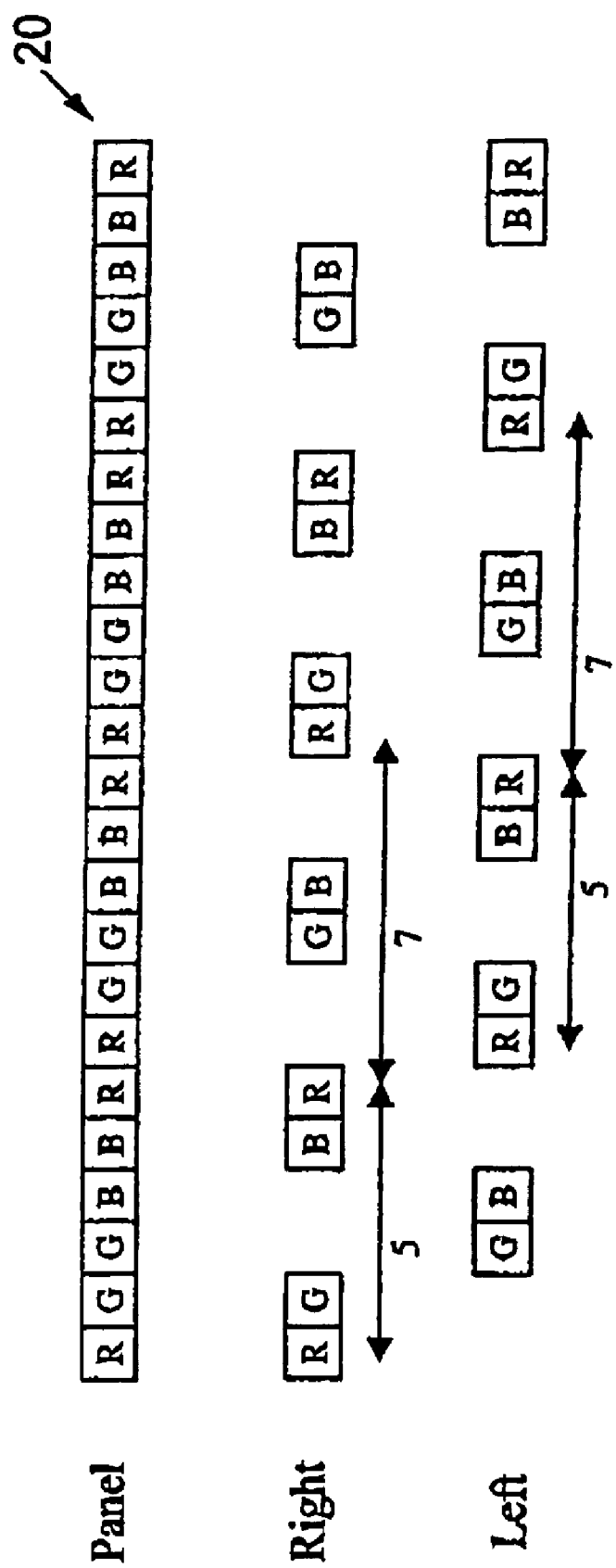
FIG. 14 illustrates colour sub-pixel arrangements on a panel and in left and right views for a display of the type shown in FIG. 9 with three different orders of colour sub-pixels.

FIG. 14(a) illustrates the use of an LCD 20 of conventional type in which "white" pixels are divided into repeating groups of colour sub-pixels. In particular, the pixel columns of each group of three columns are provided with red, green and blue filter strips so that all of colour sub-pixels in each column display the same colour and adjacent pairs of columns display different colours with the pattern red (R), green (G) and blue (B) repeating across the display. As illustrated for the right and left views, although the correct colour balance is obtained for such an arrangement, there is a substantial non-uniformity in the spacing of single colours for each view. In particular, as highlighted in FIG. 14(a), the spacing of red sub-pixels alternates between 9 and 3 colour sub-pixels. Such uneven spacing can be very visible especially for low resolution displays, and therefore detracts from image quality. Also, for each view, the ordering of the colour sub-pixels does not follow the same repeating pattern of three colour sub-pixels. For example, in the right view, the first white pixel is made up of R, G and B sub-pixels but the actual ordering is of R, G, G and B colour sub-pixels. Thus, one of the G sub-pixels belongs to another white pixel and such crossing over in the ordering of the components of each white pixel can lead to further undesirable image artefacts.

In order to avoid or reduce these problems, the colours of the pixel columns may be changed from the standard repeating RGB arrangement and examples of alternative arrangements are illustrated in FIG. 14 at (b) and (c). In FIG. 14 at (b), the colour order of the columns is changed to a repeating pattern of GBBRBRGBGBRGRG. The colour sub-pixels for each view are thus arranged as repeating groups of RGB sub-pixels so that there is no crossing over in the ordering of components of white pixels. Further, the spacing of individual colour sub-pixels in each view alternates between 5 and 7 sub-pixel, which improves the uniformity of spacing and hence the image quality.

A disadvantage of such an arrangement is that, if the display is also required to operate in a 2D mode, the sub-pixel ordering reverts to that of the actual LCD 20 and is no longer arranged as repeating groups of three colour sub-pixels. This would result in some crossing over of the ordering of the components of the white pixels and would again lead to undesirable image artefacts. However, such a compromise may be acceptable because, in the 2D mode, the full spatial resolution of the LCD is used and this helps to reduce the visibility of crossover effects.

Another advantage of the arrangement shown at (b) in FIG. 14 is achieved in the autostereoscopic 3D application of such a display. In this case, 3D pixels with zero disparity, i.e. appearing at the same position on the display to both left and right eyes, have a residual disparity of only two sub-pixels. This represents an improvement over the arrangement illustrated at (a) in FIG. 14, in which the residual disparity is 6 sub-pixels either in the same direction or alternating between in front of the screen and behind the screen.

A further arrangement of colour subpixels is illustrated at (c) in FIG. 14. In this case, each colour component is repeated so that the columns are arranged as pairs with each pair displaying the same colour component. This arrangement avoids crossover artefacts in the multiple view mode and provides more even spacing of colour components for the two views. When used in the 2D mode, the display is used with half of the spatial resolution of the LCD 20 but there is no crossing over of the components of white pixels. Such an arrangement may be used, for example, in displays with high resolution or for dual view displays where the basic resolution of the LCD has been increased to give each viewer a high resolution image.

Figure 15C:
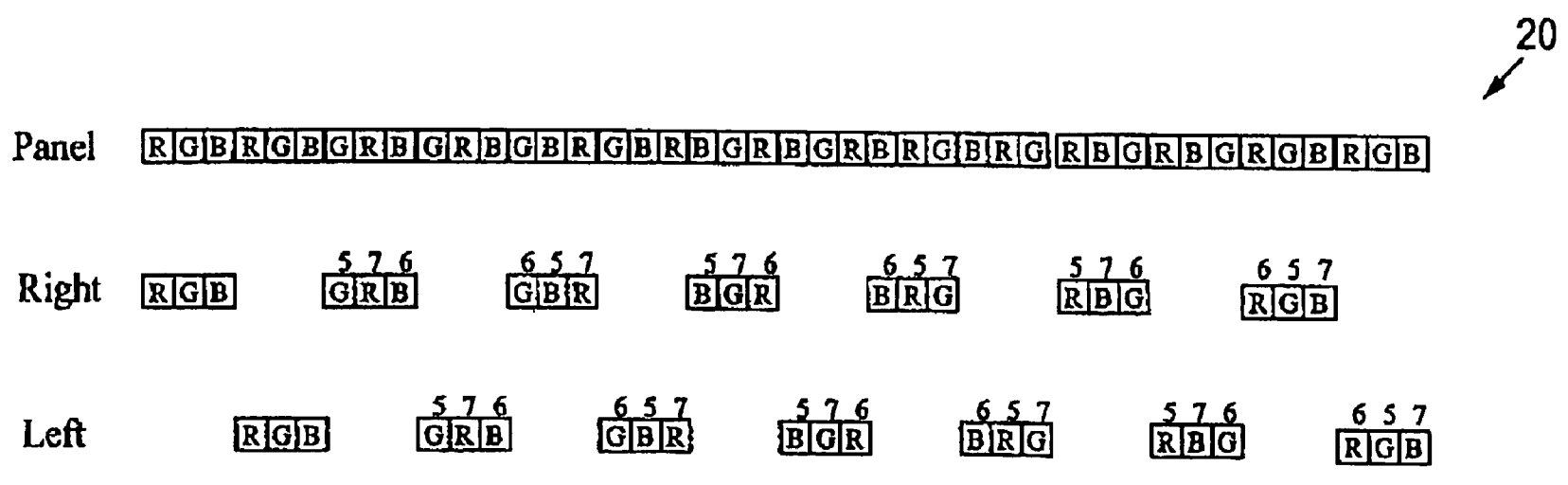

In the embodiments illustrated in FIGS. 12 to 13, the ordering of the colours is that of a conventional RGB LCD 20 as illustrated at (a) in FIG. 15. The undesirable colour artefacts which would be visible using a single wide slit with a pitch substantially equal to 6 pixel column pitches are thus avoided. However, if an error occurred during manufacture in the pitch, width or spacing of such slits, then some colour artefacts might remain. In the arrangement shown at (a) in FIG. 15, if the ratio of the contributions of each group of three adjacent RGB pixel columns is not equal, then white balance is not obtained. If this error occurs for each group of RGB pixel columns, the error will propagate across the whole display.

An alternative sequence of colour sub-pixels is illustrated at (b) in FIG. 15 to avoid or reduce the effects of this problem. In this arrangement, the order of the colour sub-pixels is "rolled" by one position for each group of sub-pixels in each view. This pattern repeats for every three groups so that, provided the LCD 20 has a sufficiently high resolution, any errors will average out across the panel and will be less visible or invisible to the viewer. However, the spacing of individual colour sub-pixels in each view varies with a pattern of 5, 5 and 8 pixels and may result in undesirable image artefacts.

A further arrangement is illustrated at (c) in FIG. 15 to overcome or reduce the effects of errors and to provide more even colour sub-pixel spacings. In this arrangement, the ordering of two neighbouring colour sub-pixels is swapped whereas the third is kept in the same position. This pattern repeats every six groupings. Thus, although errors are not averaged out as efficiently as in the arrangement shown at (b) in FIG. 15, the spacings of individual colour sub-pixels varies with a pattern of 7, 7, 6, 5, 5, 6 pixels and is therefore less visible.

In general, multiple view displays for providing an autostereoscopic display of stereoscopically related images provide an angular separation between views of about 5 to 10 degrees. However, in the case of a multiple view display intended to provide different views to different observers, such as a dual view display, a much larger angular separation is generally required and values between 50 and 100 degrees are typical. FIG. 16 illustrates an arrangement which is capable of providing such widely different separation angles in different operational modes. Such an arrangement may also be arranged to provide a single view or 2D mode of operation. Switching between modes may be performed electronically.

In the arrangement illustrated in FIG. 16, the parallax barrier 21 is of an active or controllable type and may, for example, comprise a liquid crystal device with appropriate control electrode patterning and a suitable control arrangement for selecting the different modes of operation. The patterning illustrated in FIG. 16 may be used as the patterning of the control electrodes with regions of the same shading or hatching being controlled by the same control signals.

If a 2D mode of operation is required, then the parallax barrier liquid crystal display is operated such that the whole active area is transmissive and with substantially uniform transmissivity across the device. The barrier structure is thus substantially invisible and the display may be operated to provide a full resolution single view mode.

When the display is required to provide relatively small angular separations, for example for an autostereoscopic 3D mode of operation, electrodes corresponding to the regions 30 and 31 are controlled such that these regions are transmissive whereas the remainder of the device is substantially opaque. The barrier 21 thus functions as a conventional periodic barrier with the slits being spaced apart by a substantially constant pitch across the whole barrier.

When the display is required to operate with a wider angular separation between views, electrodes corresponding to the regions 31 and 32 are controlled such that these regions are transmissive whereas the remainder of the barrier is substantially opaque. The barrier then functions as a non-period barrier in the same way as described hereinbefore for previous embodiments of the invention.

If a single view mode is not required, then regions such as 35 shown shaded black in FIG. 16 can be permanently opaque and need not be provided with any control arrangement.

Although the narrower separation angle and wider separation angle modes have been referred to as per use in autostereoscopic and non-autostereoscopic applications, respectively, this is not essential and these modes may also be used for non-autostereoscopic and autostereoscopic operation, respectively. Also, although the barrier 21 shown in FIG. 16 provides 3 slits in each group in the wider separation angle mode, each group may comprise a different number of slits. By providing the appropriate control connections to the electrodes 31 and 32, for example, it would be possible to operate the barrier with 2 slits in each group.

The upper part of FIG. 16 illustrates the colour filtering arrangement for the columns of pixels in an associated liquid crystal device. The columns are arranged as repeating groups of red, green and blue pixels 15, 16 and 17, respectively. The broken lines such as 38 illustrate the relative alignments of the controllable slits of the barrier 21 with the columns of pixels.

What is claimed is:

1. A parallax barrier comprising a plurality of substantially opaque regions defining a plurality of groups of parallel slits, each said group comprising N of said slits where N is an integer greater than one, said slits of each said group being spaced apart with a first pitch b1 in a direction perpendicular to said slits and said groups being spaced apart with a second pitch b2, in said direction perpendicular to said slits, substantially equal to 2.N.b1.

2. A barrier as claimed in claim 1, in which said slits of each said group have substantially a same maximum light transmission.

3. A barrier as claimed in claim 1, in which each of said substantially opaque regions has a finite width.

4. A barrier as claimed in claim 1, in which N is equal to 2.

5. A barrier as claimed in claim 1, in which N is equal to 3.

6. A barrier as claimed in claim 1, comprising an active device having first and second modes of operation, said active device providing said group of said slits in said first mode of operation and providing an alternative slit arrangement in said second mode.

7. A barrier as claimed in claim 6, in which said alternative slit arrangement comprises a plurality of parallel slits spaced apart with a substantially uniform pitch in said direction perpendicular to said slits.

8. A barrier as claimed in claim 6, in which said active device has an operating area and has a third mode of operation in which said active device is substantially uniformly transmissive to light throughout said operating area.

9. A multiple view display comprising a spatial light modulator and a parallax barrier comprising a plurality of substantially opaque regions of defining a plurality of groups of parallel slits, each said group comprising N of said slits where N is an integer greater than one, said slits of each said group being spaced apart with a first pitch b1 in a direction perpendicular to said slits and said groups being spaced apart with a second pitch b2, in said direction perpendicular to said slits, substantially equal to 2.N.b1.

10. A display as claimed in claim 9, in which said modulator comprises a plurality of columns of pixels extending parallel to said slits.

11. A display as claimed in claim 10, in which said columns have a third pitch p, in a direction perpendicular to longitudinal directions of said columns, which differs from said first pitch so as to provide viewpoint correction.

12. A display as claimed in claim 11, in which said first pitch b1 is given by:

$$b1 = \frac{p}{1 \pm \frac{p}{e}}$$

where p is said pitch of said columns and e is a pitch of primary viewing windows produced by said display.

13. A display as claimed in claim 10, in which said columns have a third pitch p, in a direction perpendicular to longitudinal directions of said columns, which is greater than said first pitch.

14. A display as claimed in claim 10, in which said columns comprise red, green and blue columns.

15. A display as claimed in claim 14, in which N is equal to 2.

16. A display as claimed in claim 15, in which said columns are arranged as repeating groups with each said group arranged in an order blue, red, blue, red, green, blue, green, blue, red, green, red, green.

17. A display as claimed in claim 15, in which said columns are arranged as repeating groups with each said group arranged in the order green, green, blue, blue, red, red.

18. A display as claimed in claim 14, in which N is equal to 3.

19. A display as claimed in claim 18, in which said columns are arranged as repeating groups of 18 with each said group comprising three consecutive pairs of identical triplets and with colours of said triplets of said consecutive pairs being rolled by one position with respect to each other.

20. A display as claimed in claim 18, in which said columns are arranged as repeating groups of 36 with each said group comprising six consecutive pairs of identical triplets, said triplets of said consecutive pairs having orders comprising all permutations of red, green and blue.

21. A display as claimed in claim 9, comprising a display driver for supplying image signals representing a plurality of views as interlaced columns to said modulator.

22. A display as claimed in claim 21, in which said image signals represent two views.

23. A display as claimed in claim 21, comprising an autostereoscopic display in which said image signals represent at least one pair of stereoscopic views.

* * * * *